United States Patent [19]

Mathieu et al.

[11] Patent Number: 5,441,584
[45] Date of Patent: Aug. 15, 1995

[54] METHOD FOR LAYING FILAMENTS ON A CONVEX AXISYMMETRIC SURFACE

[75] Inventors: Gérard Mathieu, Toulouse; François Monget, Merignac, both of France

[73] Assignee: Societe Anonyme Dite Aerospatiale Societe Nationale Industrielle, Paris Cedex, France

[21] Appl. No.: 130,723

[22] Filed: Oct. 4, 1993

[30] Foreign Application Priority Data

Oct. 15, 1992 [FR] France ................. 92 12617

[51] Int. Cl.⁶ ............................................. B65H 81/00
[52] U.S. Cl. ................................. 156/175; 156/169; 156/173; 220/589; 220/590
[58] Field of Search ............... 156/173, 175, 169, 93; 220/588, 589, 590, 414; 242/7.21

[56] References Cited

U.S. PATENT DOCUMENTS

| | | | |
|---|---|---|---|
| 2,901,190 | 8/1959 | Wentz | 156/170 X |
| 3,005,256 | 10/1961 | Young | 220/589 X |
| 3,083,864 | 4/1963 | Young | 220/590 |
| 3,140,058 | 7/1964 | Courtney | 156/175 X |
| 3,356,120 | 12/1967 | Nohmura | 220/414 X |
| 3,443,765 | 5/1969 | Jube et al. | 156/175 X |
| 4,053,081 | 10/1977 | Minke . | |
| 4,080,915 | 3/1978 | Bompard et al. | 242/7.21 X |
| 4,366,658 | 1/1983 | Maistre . | |
| 4,529,139 | 7/1985 | Smith et al. | 156/175 X |
| 4,863,660 | 9/1989 | Cahuzac et al. | 156/173 X |

FOREIGN PATENT DOCUMENTS

| | | | |
|---|---|---|---|
| 741150 | 8/1966 | Canada | 220/590 |
| 785600 | 5/1968 | Canada | 156/189 |
| 0032858 | 7/1981 | European Pat. Off. . | |
| 1414309 | 9/1965 | France . | |
| 2038524 | 1/1971 | France . | |
| 2575966 | 7/1986 | France . | |
| 2612950 | 9/1988 | France . | |
| 1235777 | 3/1967 | Germany . | |
| 2746290 | 4/1979 | Germany | 156/161 |
| 4723812 | 7/1972 | Japan | 220/590 |
| 252728 | 2/1990 | Japan | 156/173 |
| 1064590 | 4/1967 | United Kingdom . | |

*Primary Examiner*—Jeff H. Aftergut
*Attorney, Agent, or Firm*—Sandler, Greenblum & Bernstein

[57] ABSTRACT

Method for laying filaments on a convex axisymmetric surface, especially a hemispherical surface, provided with a circular hole or a dead zone centered on the pole, wherein a regular set of points are defined on a reference circle of the surface, the filament being laid along a geodesic path from one first departure point to one first arrival point on the reference circle, the same laying process being reproduced for a second pair of departure and arrival points so as to lay a set of filaments (so-called a lap) and then the same laying process is repeated via successive shifts until each point of the reference circle is at the same time and solely a single departure and arrival point, so as to obtain a layer, and possibly restarting the process until the desired thickness is obtained.

14 Claims, 4 Drawing Sheets

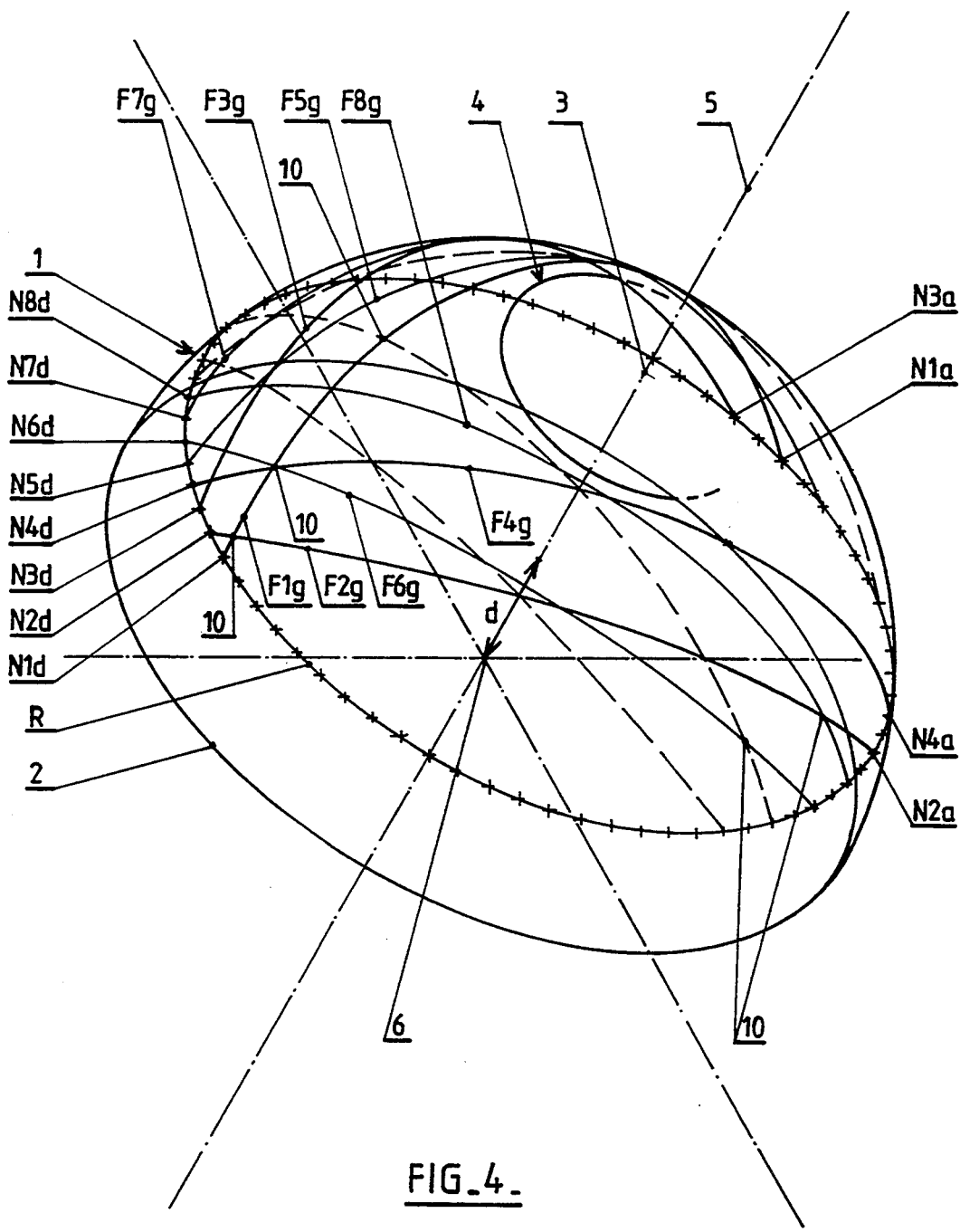
FIG_4_

METHOD FOR LAYING FILAMENTS ON A CONVEX AXISYMMETRIC SURFACE

BACKGROUND OF THE INVENTION

1. Field of the Invention

The present invention concerns the provision of bulged structures constituted by a casing with in particular a hemispherical shape and externally covered with resistant fibers possibly bound together by a settable binder.

The invention applies more specifically, but not exclusively, to the provision of storage vessels for fluids under pressure and in particular vessels known as gas storage "bottles", these gases being air, oxygen, nitrogen, carbonic acid used in various industrial sectors.

2. Discussion of Background Information

This type of vessel comprises a central cylindrical hoop provided with bulged end portions, generally hemispheric, the entire structure being reinforced by means of resistant fibers bound together by a settable binder.

One of the end portions comprises at its central portion a passage hole so that the reinforcement of the bottle end portions is embodied by making a reserve on the top portion of the two hemispheres of the end portions.

The current technique for filament laying used for embodying such a structure consists of a simple winding with an elementary pattern during which the filament to be laid passes only once on the hemispherical cap, the passage being uninterruptedly repeated with a slight angular shift as many times as there are filaments on the layer.

The drawback of this technique resides in the filament accumulating at the periphery of the hole of one of the end portions and the dead zone corresponding to the other end portion, the filament thus forming a "bulb", which does not provide a constant thickness when reinforcing these end portions of the bottles.

SUMMARY OF THE INVENTION

One object of the invention is to overcome the above-discussed drawbacks by proposing a new technique for laying filaments on bulged surfaces and in particular spherical surfaces, so as to embody structures of the bottle type as defined above, or, generally speaking, any structure constituted by an element whose external surface exhibits a convex axisymmetrical geometry and comprises, in the zone of the axis of symmetry, a hole or dead zone centered on the axis, which must not be covered. Such a structure may, for example, constitute a front element resisting thermomechanical stresses for affording thermic protection against bodies entering the atmosphere, or one portion of a larger structure.

The object of the invention is to provide a method for laying filaments on a convex axisymmetric surface, in particular hemispherical surface, provided with a hole or a circular dead zone, centered on the pole, wherein:
- a reference circle is defined and is parallel to the external edge of the surface and situated at a specific distance from the plane of the edge,
- a regular series of points is defined on the reference circle,
- a filament or a set of filaments are laid along a first approximately geodesic path on the surface from the external edge up to a first point, so-called departure point, of the reference circle,
- laying of the filament from the departure point up to a second point, so-called arrival point, of the reference circle, along a second path, also approximately geodesic,
- laying of the filament beyond the arrival point up to the external edge along a third approximately geodesic path,
- the same laying process is repeated by passing through a second departure point and through a second arrival point, both points being on the circle,
- repeating such laying as many times as possible without any crossing, at least in the area close to said hole or dead zone, of the filaments being laid, so as to lay a set of filaments, so-called a lap, then
- repeating the same lap laying process with successive shifts until each point of the reference circle is, at the same time and once only, a departure point and an arrival point so as to obtain one layer, and
- the process is possibly restarted until the desired thickness is obtained.

Such a method makes it possible to carry out on the convex axisymmetric surface a geodesic laying of filaments with a roughly constant thickness from the hole or dead zone up to the vicinity of the inflection circle of the filaments path defined by the departure and arrival points.

During laying such a so-called lap, the filaments may all be laid on the same side of the hole or the dead zone or on both sides of the latter, this second way of laying allowing for better distribution of the excess thicknesses due to the intersection of filaments of the superimposed laps.

It is also possible to have the laying pattern of laps vary, the laps constituting a layer in the sense defined earlier, from one layer to the next, so as to obtain a progressive thickness profile.

Between two superimposed layers or between each layer, it is also possible to carry out a filament laying by a simple winding operation as stated in the preamble.

Similarly, laying according to the invention may be completed by a stitching introducing filaments along a third direction locally orthogonal with respect to the laying directions according to the invention.

Another object of the invention is also to provide a device for implementing the above mentioned method, wherein it comprises a set of needles or the like implanted projecting onto the surface to be covered along the reference circle, preferably at an equal distance from one another and defining the departure and arrival points between which the filament or the set of filaments is laid geodesically with the aid of a known-type of winding machine.

Finally, the invention concerns any structure wound in accordance with the invention.

BRIEF DESCRIPTION OF THE DRAWINGS

Other characteristics and advantages of the technique of the invention shall be more readily understood from a reading of the following description of an embodiment for implementing the method defined above, this description being given solely by way of example and with reference to the accompanying drawings in which:

FIG. 4 is a perspective view of the surface of FIG. 3.

DETAILED DESCRIPTION OF THE PREFERRED EMBODIMENTS

Figure 1:
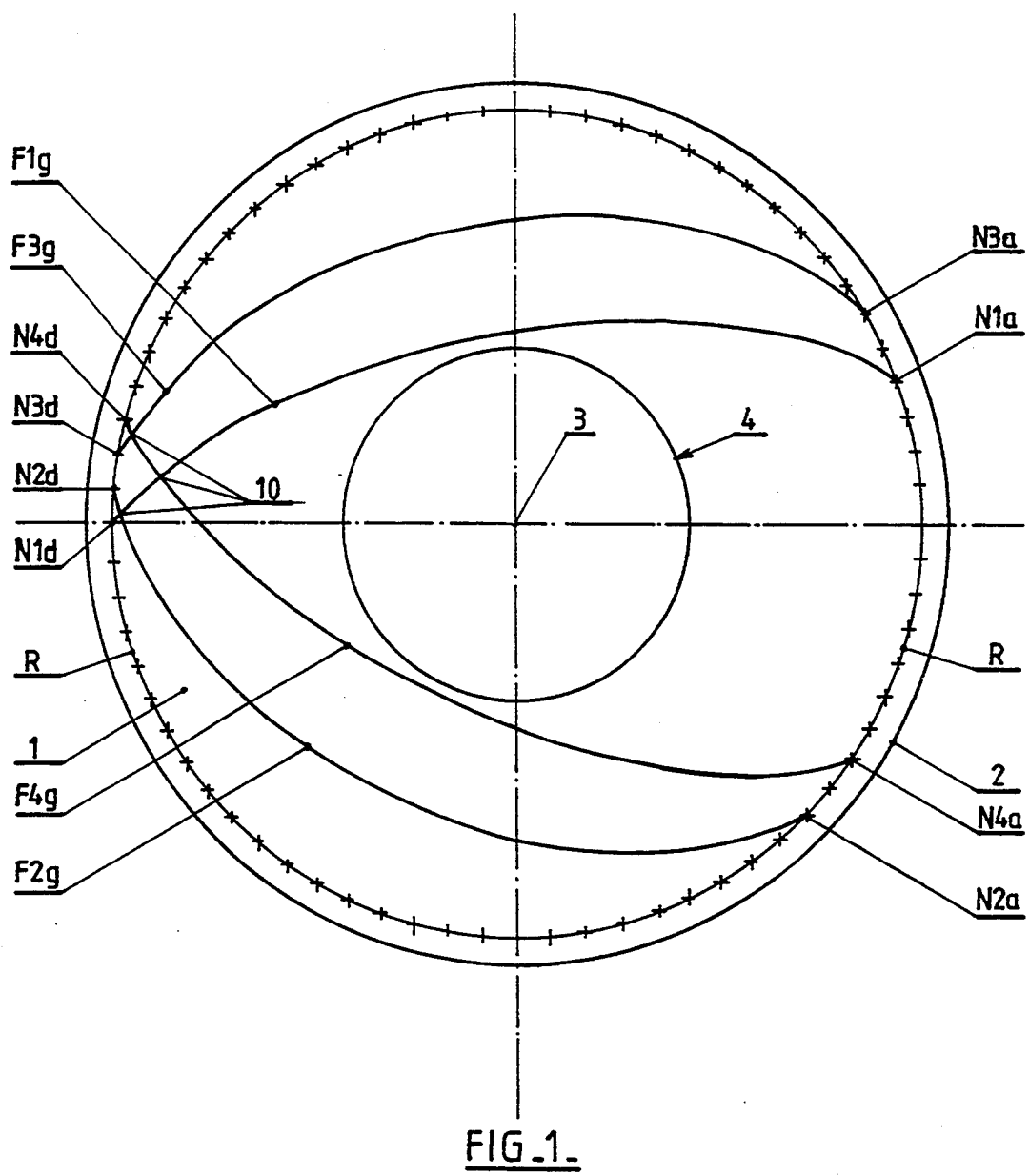
FIG. 1 is an end view of a hemispherical surface wound with a first lap laid in accordance with a carrying-out of the method of the invention.
Figure 2:
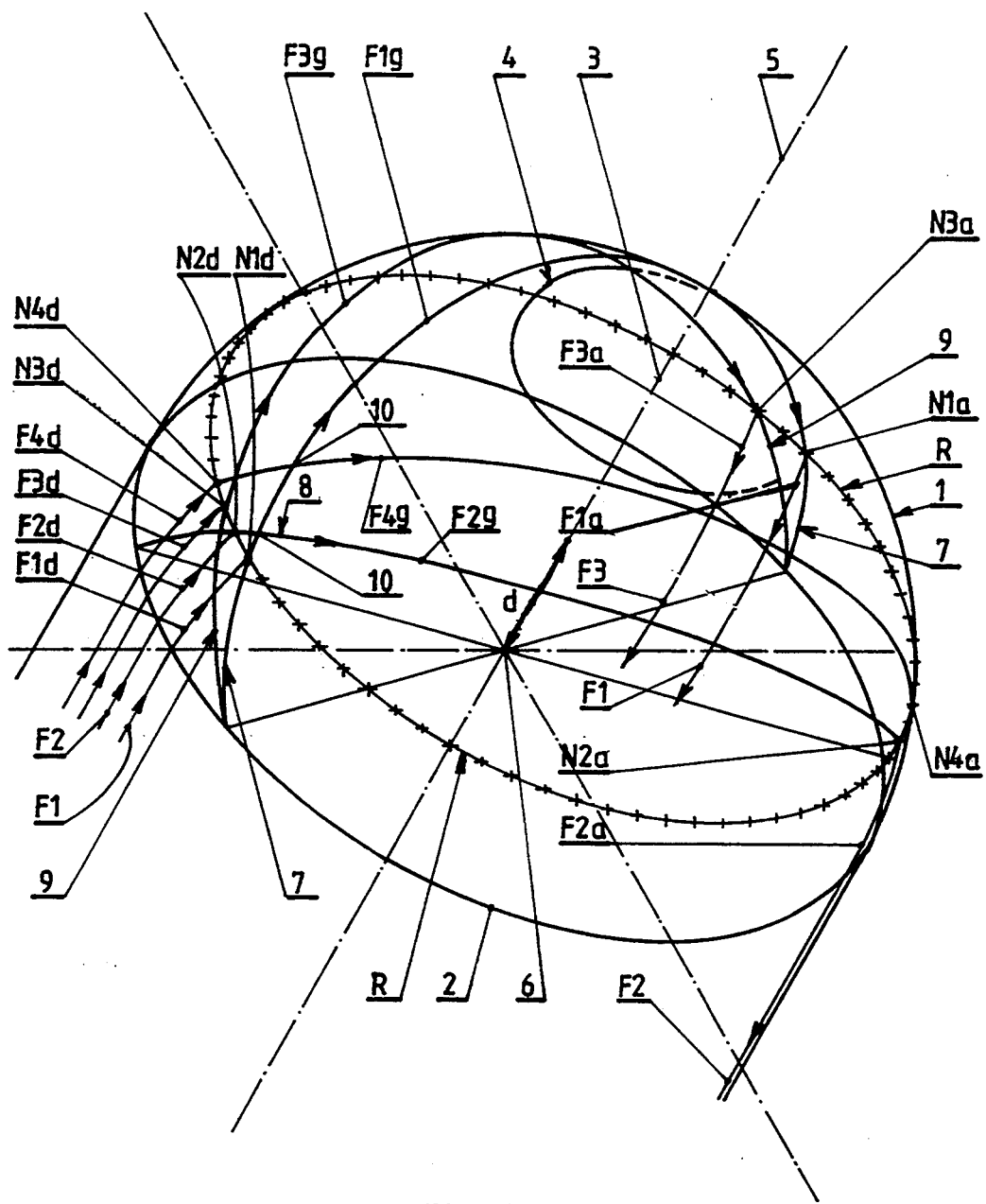
FIG. 2 is a perspective view of the surface of FIG. 1.

Shown in FIGS. 1 to 4 are: at 1, a hemispherical surface with its external edge materialized by the greater circle 2, its pole 3, a hole or circular dead zone 4 centered on the pole 3 and which must not be covered, the axis 5 passing through the pole 3 and the center 6 of the hemispherical surface 1.

A filament formed of several continuous and grouped filaments is laid onto the hemispherical surface 1 by successive passages.

The first passage is denoted by F1, the filament being represented on the greater circle 2 approximately along a generating line of the cylinder extending the hemisphere 1.

According to the method of the invention, the filament F1 is laid on the surface 1 approximately along a meridian (section F1$d$) up to a point N1$d$, so-called the first departure point belonging to the lap N1, and situated on a circle R known as the reference circle defined by the intersection of the surface 1 with a plane parallel to the greater circle 2 and situated at a distance d from the greater circle plane.

From the point N1$d$, the filament F1 is laid (section F1$g$) on the cap delimited by the circle R along an arc of a great circle 7 of the surface 1 up to an arrival point N1$a$ of the circle R, which is determined so that said section F1$g$, the reference g indicating that it concerns a geodesic laying, is tangent to the hole or circle 4 or not far from the latter.

Between the circle R and the greater circle 2, the filament F1 is laid approximately along a meridian of the surface 1 (section F1$a$) and then beyond the greater circle 2, the filament F1 is approximately parallel to the axis 5.

During the next passage F2 of the filament, the latter is laid approximately along a meridian (section F2$d$) between the greater circle 2 and the circle R up to a point N2$d$ of the latter situated close to the point N1$d$.

From the point N2$d$, the filament F2 is laid (section F2$g$) on the cap delimited by the circle R along an arc of a great circle 8 of the surface up to an arrival point N2$a$ of the circle R.

Beyond the point N2$a$, the filament is laid approximately along a meridian (section F2$a$) up to the greater circle 2 and next the filament F2 is approximately parallel to the axis 5.

It is to be noted that in the embodiment illustrated by FIGS. 1 to 4, the arrival point N2$a$ selected for the filament F2 is, with respect to a plane containing the axis 5 and the section F2$d$, on the side opposite the point N2$a$, so that the section F2$g$ goes round the hole or circle 4 via the other side with respect to the section F1$g$.

Moreover, the location of the point N2$a$ on the circle R is selected so as to approximately distance the filament section F2$g$ from the hole or circle 4.

Furthermore, the location of the point N2$a$ on the circle R is selected so as to distance the filament section F2$g$ considerably from the hole or circle 4.

Another point could of course be selected, for example, to bring the section F2$g$ closer to the hole or circle 4.

During the third passage of the filament (F3), the latter is laid, as in the other passages, approximately along a meridian (F3$d$) up to a departure point N3$d$ on the circle R.

Beyond the circle R, the filament is laid along an arc of a great circle 9 (section F3$g$) up to a point N3$a$ of the circle R situated at a distance from the point N1$a$ equal to that between the points N1$d$ and N3$d$ and on the side of the circle R not making the sections F1$g$ and F3$g$ intersect with each other.

Beyond the point N3$a$, the filament approximately follows a meridian (section F3$a$) as for the preceding passages.

In the embodiment shown in FIGS. 1 to 4, the laying of the section F3$g$ is symmetrical with that of the laying of the section F2$g$ with respect to a plane containing the axis 5 and passing at an equal distance from the points N2$d$ and N3$d$.

Finally, during the fourth passage (filament F4), the same process is continued with a departure point N4$d$ and an arrival point N4$a$ on the circle R, the geodesic laying section F4$g$ being disposed symmetrically to the section F1$g$ with respect to the plane defined above.

The sections F1$g$ to F4$g$ constitute a lap, that is a set of filaments able to be laid on the spherical cap delimited by the circle R without the filaments intersecting, at least in the cap zone closest to the hole or circle 4. If in the illustration given on the figures, the sections F1$g$ to F4$g$ cross at 10, this occurs in a strip of the cap close to the circle R.

A lap preferably shall contain the maximum number of filaments able to be laid geodesically without crossing on the zone close to the hole or circle 4.

The departure points N1$d$ to N4$d$ and the arrival points N1$a$ to N4$a$ form part of a series of points evenly distributed along the circle R and whose number is preferably a multiple of the number of filaments per lap.

In the embodiment shown, the circle R is divided into seventy-two points.

Considering that a layer shall be obtained when each of the seventy-two points (N1$d$, N2$d$, N3$d$, N4$d$, etc) shall have been taken, successively and up to the return to the original point N1$d$, as a departure point of laying, it is then necessary to lay eighteen laps, such as the lap N1 containing the sections F1$g$ to F4$g$.

Figure 3:
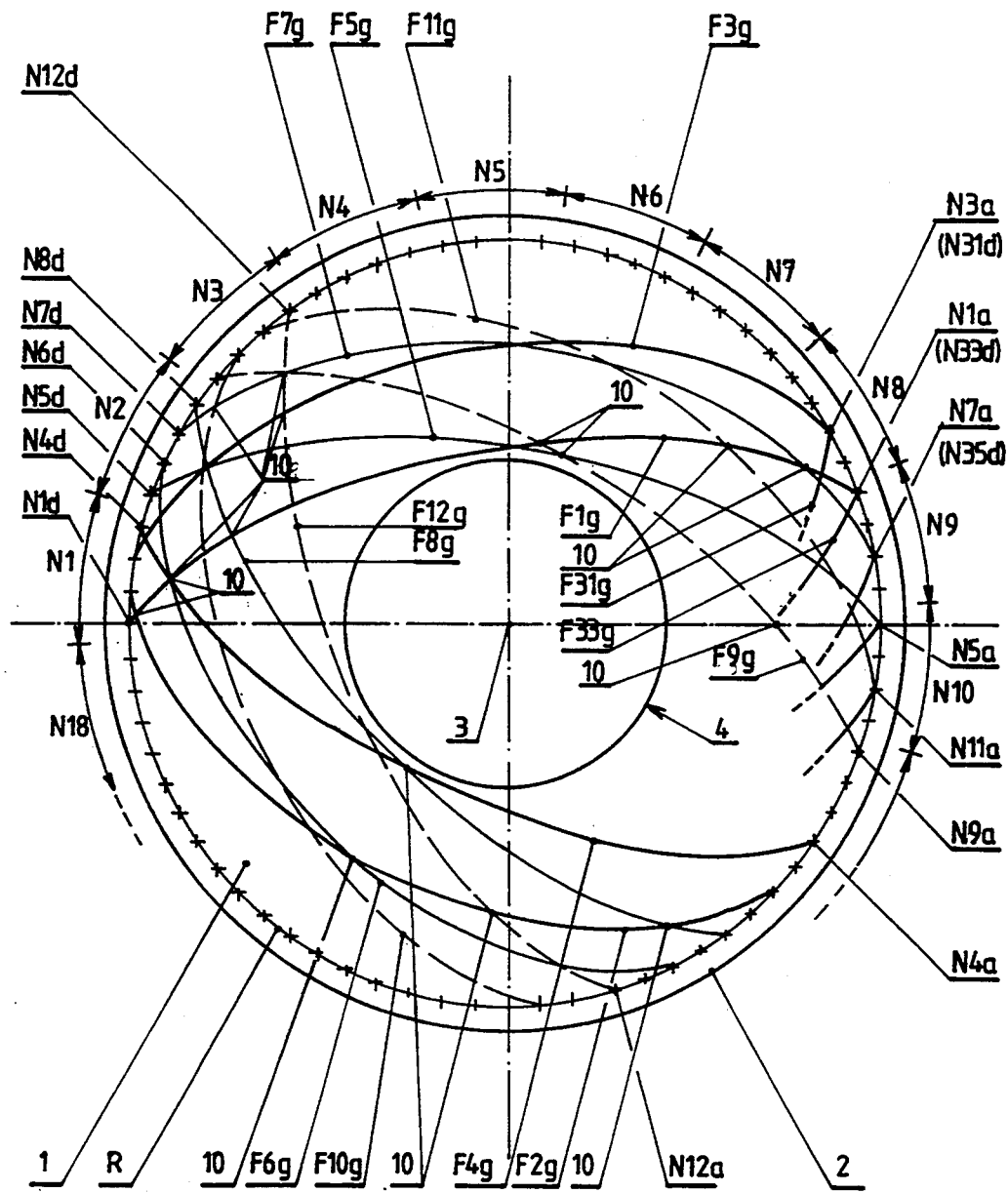
FIG. 3 shows the surface of FIG. 1 wound with three laps.

FIG. 3 shows the first nine laps N1 to N9 identified by their departure points on the circle R and which cover half of the circle R. It is to be noted that, as regards the laps N8 and N9, some of the departure points shall be merged with the arrival points of the laps N1 and N2. This is the case, for example, of the departure points N31$d$, N33$d$ and N35$d$ which are respectively merged with the arrival points N3$a$, N1$a$ and N7$a$.

At these points, both as regards departure and arrival, the two filaments of the sections laid on the cap are placed, one being on one side of the hole or circle 4, and the other on the other side, as shown for example on FIG. 3 by the sections F3$g$, F31$g$ and F1$g$, F33$g$.

Similarly, some of the filaments laid on the cap from the departure points of the laps N8, N9 reach arrival points which are merged with some of the points N1$d$ to N8$d$, the filaments in question being at these points also disposed in opposition with the filament sections F1$g$ to F8$g$ with respect to the hole or circle 4.

Once the laps N10 to N18 have been placed so as to form a layer as defined above, all the points of the circle R will be, at the same time and for once only, the departure point and the arrival point.

The successive laps N1 to N18 are preferably laid according to the same pattern, the filaments as regards each lap being placed on both sides of the hole or circle 4, as illustrated for example by the sections F5g, F7g and F6g, F8g for the lap N2 and by the sections F9g, F11g and F10g, F12g for the lap N3.

This layer exhibits no annular bulb near the hole or circle 4, since the laying method allows for distribution of the intersections 10 of the filaments over the entire extent of the covered spherical cap, as can be seen on FIG. 3.

Thus, not only the laying of the filaments on the cap is geodesic, which ensures good filament stability, but the intersections of the filaments are distributed regularly on a wide surface, thus providing the layer with a more regular thickness.

The desired thickness of the covering at the right of the spherical surface 1 is obtained by carrying out an appropriate number of layers.

As regards each lap of four filaments (F1g to F4g; F5g to F8g; F9g to F12g), instead of carrying out an alternate laying of two filaments on one side of the hole 4 and two on the other, the four filaments could be laid on the same side of the hole or circle 4, still following arcs of a great circle.

The alternate laying as illustrated makes it possible to obtain a thicker layer and a more regular fibered structure but less dense, since more filament crossings are obtained than with a laying on the same side of the hole or circle 4.

Moreover, in a given lap, it is possible to not strictly follow the ascending order of the points defined on the circle R at lay, for example, the filaments of the lap N1 by beginning with any of the four departure points N1d to N4d, and then during the second passage, by passing through any one of the three remaining departure points and so on.

Advantageously, the various layers shall be embodied with a mutual angular shift so as to homogenize the fibered structure.

This mutual shift is for example obtained by taking as a first departure point of the first lap of the second layer, no longer the point N1d of FIGS. 1 to 4, but the point immediately following N2d. This avoids superimposing the laps of a given row from one layer to the next one.

This shift may also be obtained by reversing the laying direction of the laps of the following layer, i.e., by starting in an anticlockwise direction on the circle R, whereas in the method shown in FIGS. 1 to 4, the laying of successive laps N1 to N18 is carried out in a clockwise direction along the circle R.

The laying pattern of the laps of each layer may be possibly changed so as to obtain the desired thickness profile.

In addition, a conventional interlayer winding may be embodied and similarly, in accordance with the instructions of the document FR-2,612,950 in the name of the assignee, to carry out, for example, the insertion of a filament into the thickness (third direction) of the fibered structure by means of stitching.

The distance d between the planes of circle R and the greater circle 2 may vary. However, it must not be too small, since this would result in a tendency for a concentration of filament intersections in an annular strip close to the circle R. The distance d must also not be too large, as this would result in increasing the annular zone between the circle R and the greater circle 2, covered with the filaments laid along meridians.

The change of direction or inflection of the path of the filaments at the levels of the departure and arrival points on the circle R is carried out, for example, with the aid of pins radially implanted in the surface 1 at the level of points N1d, N2d; N1a,N2a.

These pins make it possible to easily lay a filament on either side of each needle so as to provide the filament with the desired direction on either side of the hole or circle 4.

This technique for implanting needles and winding from such a set of needles is well known in itself and is illustrated, for example, by the above mentioned document FR-2,612,950.

After the filaments are placed, the pins are removed or left in place. Fuse pins my also be used.

In the above mentioned laying example, so as to render understanding easier, the departure and arrival points on the reference circle have been defined, but it is clear that a reverse laying could have been effected, i.e., by starting from the aforenamed arrival points on the circle R and distanced from each other so as to reach the aforenamed departure points and disposed subsequently.

The method of the invention makes it possible to manufacture "bottles" as defined earlier comprising a central hoop and two hemispherical end portions, each comprising a circular covering reserve centered on the pole and corresponding, as regards one of the end portions, to the opening of the bottle.

Both end portions exhibit a roughly constant thickness along one meridian without any bulb on the periphery of the central reserve.

The hoop and the two end portions are advantageously wound at the same time with the filament being laid on the end portions according to the invention and defining one or several filament layers laid longitudinally on the hoop so as to constitute a weft insertion which is then recovered with a circumferential winding from the same filament solely at the right of the hoop.

Generally speaking, the method of the invention makes it possible to cover any convex axisymmetric surface, regardless of the nature and the destination of the covered object and irrespective of whether it forms a whole in itself or is a part of a larger object.

Finally, the invention is of course not restricted to the methods of embodiments represented and described above, but on the contrary, covers all possible variants, especially as regards the number of filaments laid per lap, the laying method, alternate or otherwise, the filaments of a given lap, the number of laps for forming a covering layer as defined earlier, the number and laying pattern of the laps forming a layer, as well as the nature of means able to change the laying direction of the filaments at the level of the reference circle R.

The filament used, made up of a number of longitudinal filaments, may be glass, carbon, "kevlar" alumina or boron fibers, etc, possibly preimpregnated.

Moreover, it is to be noted that each filament may be constituted by a set of filaments in the form of a ribbon strip or strand.

The fibered structure thus laid may then be impregnated, densified, etc.

We claim:

1. A method for laying filaments comprising single filaments or sets of filaments on a convex axisymmetric surface having at least one of an opening and a circular dead zone centered on a pole of the axisymmetric surface, the method comprising:

(a) defining a reference circle parallel to an external edge of the surface and situated at a specific distance from a plane passing through the external edge, and defining a regular series of points on the reference circle;

(b) laying a filament along a first substantially geodesic path on the surface from the external edge up to a first departure point of the reference circle;

(c) laying the filament from the first departure point up to a first arrival point of the reference circle along a second substantially geodesic path;

(d) laying the filament beyond the first arrival point up to the external edge along a third substantially geodesic path;

(e) repeating laying steps (b)–(d) by passing at least one additional filament through at least one additional departure point and through at least one corresponding additional arrival point, both the at least one additional departure point and the at least one corresponding additional arrival point being on the reference circle, so as to lay a lap of filaments; and (f) repeating layering of laps, with successive shifting on the points defined on the reference circle, so as to obtain a layer wherein each point defined on the reference circle within the layer comprises only one departure point and arrival point.

2. The method according to claim 1, wherein during the laying of a lap, the filaments are laid on both sides of the opening or dead zone.

3. The method according to claim 1, wherein in the course of laying a lap, the filaments are laid on one side of the opening or dead zone.

4. The method according to claim 1, wherein departure points of each lap of a layer are chosen from a group of successive points along the reference circle, the departure points being selected within the group in any order.

5. The method according to claim 4, wherein, from one layer to the next one, the departure point of the first lap is angularly shifted with respect to that of the first lap of the previous layer.

6. The method according to claim 4, wherein, from a preceding layer to a next layer, the departure point of the first lap within the next layer is the same as the departure point of the first lap of the preceding layer, and the laps of the next layer are laid in a direction opposite a direction for laying the laps of the preceding layer.

7. The method according to claim 1, wherein laps within a layer do not all have the same filament laying pattern.

8. The method according to claim 1, wherein a simple winding with an elementary pattern is carried out between each layer.

9. The method according to claim 1, wherein the laying of the layer is completed by a stitching introducing filaments along a third direction.

10. The method according to claim 1, wherein the layering of laps is repeated until at least one additional layer is laid on the surface.

11. The method according to claim 1, wherein the laying of the layers is completed by a stitching introducing filaments along a third direction.

12. The method according to claim 1, wherein the surface comprises a hemispherical surface.

13. The method according to claim 1, wherein, in the laying of the lap of step (e), the filaments do not cross at least in an area close to the opening or dead zone.

14. The method according to claim 1, wherein, in the laying of the lap of step (e), the filaments do not cross in an area close to the opening or dead zone.

* * * * *